US 6,390,548 B1

(12) United States Patent
Cole

(10) Patent No.: US 6,390,548 B1
(45) Date of Patent: May 21, 2002

(54) BICYCLE SEAT WITH INFLATABLE INTERIOR

(76) Inventor: Clarence Cole, 24804 Eucalyptus Ave., Moreno Valley, CA (US) 92553

( * ) Notice: Subject to any disclaimer, the term of this patent is extended or adjusted under 35 U.S.C. 154(b) by 0 days.

(21) Appl. No.: 09/571,208

(22) Filed: May 16, 2000

Related U.S. Application Data

(60) Provisional application No. 60/136,342, filed on May 28, 1999.

(51) Int. Cl.$^7$ .................................................. B62J 1/26
(52) U.S. Cl. ............. 297/199; 297/452.41; 297/DIG. 3
(58) Field of Search ............................. 297/199, 195.1, 297/452.41, DIG. 3

(56) References Cited

U.S. PATENT DOCUMENTS

| | | | | |
|---|---|---|---|---|
| 4,957,286 A | * | 9/1990 | Person, II et al. | 297/199 X |
| 5,280,993 A | * | 1/1994 | Hsh | 297/DIG. 3 X |
| 5,356,205 A | * | 10/1994 | Calvert et al. | 297/452.41 |
| 5,670,232 A | * | 9/1997 | Bigolin | 297/452.41 X |
| 5,904,396 A | * | 5/1999 | Yates | 297/195.1 X |
| 6,039,396 A | * | 3/2000 | Muser | 297/195.1 X |
| 6,135,550 A | * | 10/2000 | Tucho | 297/199 |
| 6,305,743 B1 | * | 10/2001 | Wheeler | 297/199 |

* cited by examiner

Primary Examiner—Milton Nelson, Jr.
Assistant Examiner—Rodney B. White
(74) Attorney, Agent, or Firm—Goldstein Law Offices, P.C.

(57) ABSTRACT

A bicycle seat with inflatable interior including a bicycle seat comprised of a seat portion and a stem portion. The stem portion couples the bicycle seat to a frame of a standard bicycle. The seat portion has an outer layer and a padded inner layer. The padded inner layer has a recess formed in a central portion thereof. An inflatable cushion is disposed within the recess formed in the central portion of the padded inner layer of the bicycle seat. The inflatable cushion has a generally hourglass configuration. The inflatable cushion has an air tube extending outwardly therefrom and extending outwardly of the bicycle seat. A free end of the air tube has a hand pump coupled thereto for selectively pumping air into the cushion.

1 Claim, 1 Drawing Sheet

BICYCLE SEAT WITH INFLATABLE INTERIOR

CROSS REFERENCES AND RELATED SUBJECT MATTER

This application relates to subject matter contained in provisional patent application Ser. No. 60/136,342, filed in the United States Patent & Trademark Office on May 28, 1999.

SPECIFICATION

TO ALL WHOM IT MAY CONCERN:

BE IT KNOWN THAT I, CLARENCE COLE, a citizen of the United States of America, have invented new and useful improvements in a BICYCLE SEAT WITH INFLATABLE INTERIOR of which the following is a specification:

BACKGROUND OF THE INVENTION

The present invention relates to a bicycle seat with inflatable interior and more particularly pertains to protecting the genital area of a bicyclist.

The discomfort of bicycle riders is a problem of long standing, beginning with the original wooden seats and extending through various leather and padded seats, some of them supported by various spring arrangements. A number of seats have been developed employing a pair of cushions each of which supports beneath an ischial tuberosity of the rider. Unfortunately, these cushions do not protect or add comfort while seated to the genital area of the rider. What is needed is a bicycle seat that provides comfort to the genital area as well as protect the prostate gland of the rider.

The present invention attempts to solve the abovementioned problem by providing a bicycle seat with an inflatable interior bladder that is centrally located so as to provide protection to the genital area and the prostate gland of the rider.

The use of bicycle seats is known in the prior art. More specifically, bicycle seats heretofore devised and utilized for the purpose of adjusting for comfort of bicyclists are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,203,607 to Landi discloses an ergonomic bicycle seat having a first layer of conventional foam padding and a second layer of thermoplastic elastomeric honeycomb padding. U.S. Pat. No. 5,720,518 to Harrison discloses a universal bike and exercycle seat cushion accessory having two separate and adjustable cushioning devices. U.S. Pat. No. 5,108,076 to Chiarella discloses an anatomical multilayer bicycle seat including an encapsulated gel layer. U.S. Pat. No. 4,429,915 to Flager discloses a bicycle seat which distributes the weight of the rider.

While these devices fulfill their respective, particular objective and requirements, the aforementioned patents do not describe a bicycle seat with inflatable interior for protecting the genital area of a bicyclist.

In this respect, the bicycle seat with inflatable interior according to the present invention substantially departs from the conventional concepts and designs of the prior art, and in doing so provides an apparatus primarily developed for the purpose of protecting the genital area of a bicyclist.

Therefore, it can be appreciated that there exists a continuing need for new and improved bicycle seat with inflatable interior which can be used for protecting the genital area of a bicyclist. In this regard, the present invention substantially fulfills this need.

SUMMARY OF THE INVENTION

In the view of the foregoing disadvantages inherent in the known types of bicycle seats now present in the prior art, the present invention provides an improved bicycle seat with inflatable interior. As such, the general purpose of the present invention, which will be described subsequently in greater detail, is to provide a new and improved bicycle seat with inflatable interior and method which has all the advantages of the prior art and none of the disadvantages.

To attain this, the present invention essentially comprises a bicycle seat comprised of a seat portion and a stem portion. The stem portion couples the bicycle seat to a frame of a standard bicycle. The seat portion has an outer layer and a padded inner layer. The padded inner layer has a recess formed in a central portion thereof. An inflatable cushion is disposed within the recess formed in the central portion of the padded inner layer of the bicycle seat. The inflatable cushion has a generally hourglass configuration. The inflatable cushion has an air tube extending outwardly therefrom and extending outwardly of the bicycle seat. A free end of the air tube has a hand pump coupled thereto for selectively pumping air into the cushion.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved bicycle seat with inflatable interior which has all the advantages of the prior art bicycle seats and none of the disadvantages.

It is another object of the present invention to provide a new and improved bicycle seat with inflatable interior which may be easily and efficiently manufactured and marketed.

It is a further object of the present invention to provide a new and improved bicycle seat with inflatable interior which is of durable and reliable construction.

An even further object of the present invention is to provide a new and improved bicycle seat with inflatable interior which is susceptible of a low cost of manufacture with regard to both materials and labor, and which accordingly is then susceptible of low prices of sale to the consuming public, thereby making such a bicycle seat with inflatable interior economically available to the buying public.

Even still another object of the present invention is to provide a new and improved bicycle seat with inflatable interior for protecting the genital area of a bicyclist.

Lastly, it is an object of the present invention to provide a new and improved bicycle seat with inflatable interior including a bicycle seat comprised of a seat portion and a stem portion. The stem portion couples the bicycle seat to a frame of a standard bicycle. The seat portion has an outer layer and a padded inner layer. The padded inner layer has a recess formed in a central portion thereof. An inflatable cushion is disposed within the recess formed in the central portion of the padded inner layer of the bicycle seat. The inflatable cushion has a generally hourglass configuration. The inflatable cushion has an air tube extending outwardly therefrom and extending outwardly of the bicycle seat. A free end of the air tube has a hand pump coupled thereto for selectively pumping air into the cushion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
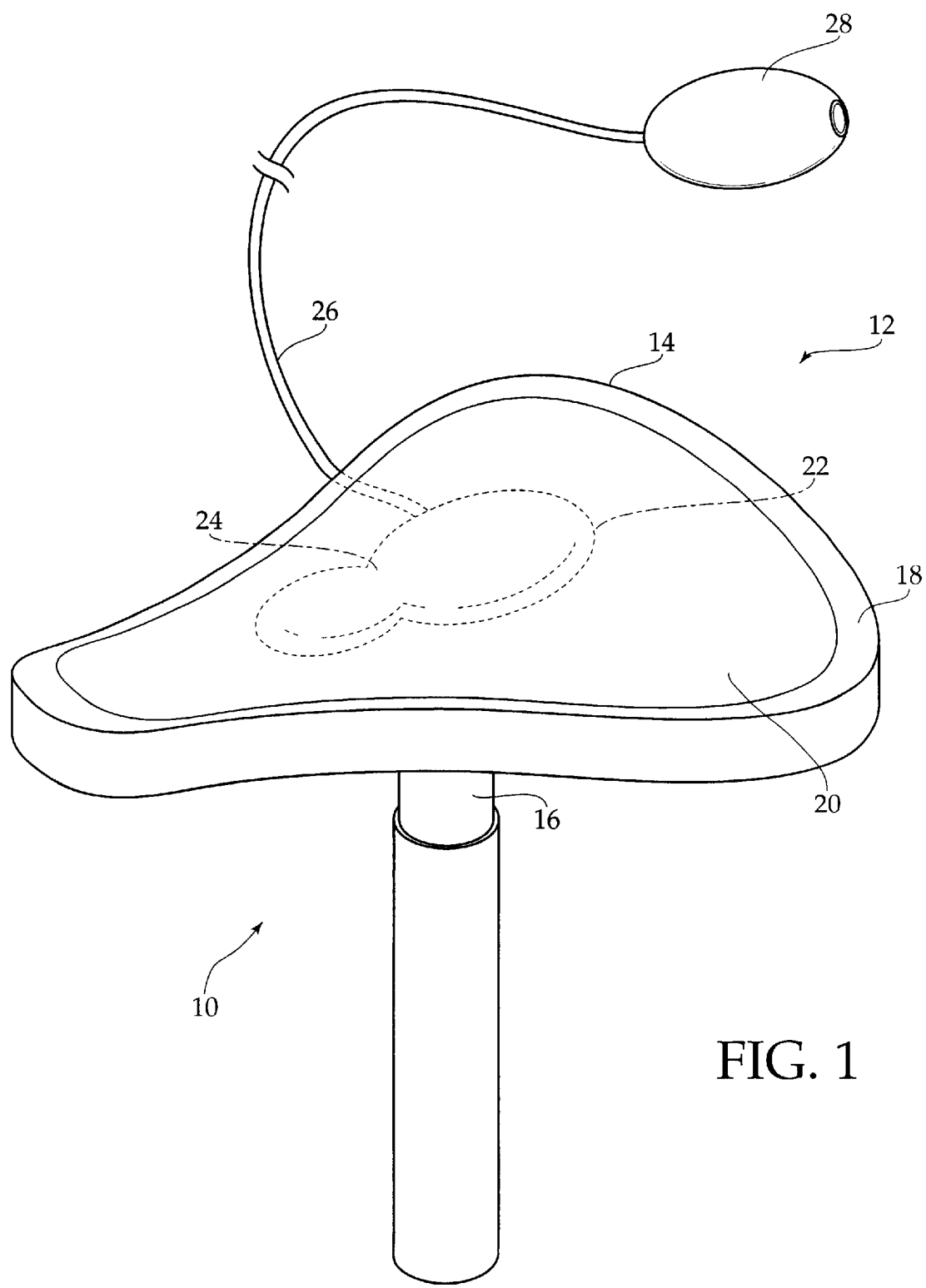
FIG. 1 is a perspective view of the preferred embodiment of the bicycle seat with inflatable interior constructed in accordance with the principles of the present invention.

With reference now to the drawings, and in particular, to FIG. 1 thereof, the preferred embodiment of the new and improved bicycle seat with inflatable interior embodying the principles and concepts of the present invention and generally designated by the reference number 10 will be described.

Specifically, it will be noted in the various Figures that the device relates to a bicycle seat with inflatable interior for protecting the genital area of a bicyclist. In its broadest context, the device consists of a bicycle seat and an inflatable cushion. Such components are individually configured and correlated with respect to each other so as to attain the desired objective.

The bicycle seat 12 is comprised of a seat portion 14 and a stem portion 16. The stem portion 16 couples the bicycle seat 12 to a frame of a standard bicycle. The seat portion 14 has an outer layer 18 and a padded inner layer 20. The padded inner layer 20 has a recess 22 formed in a central portion thereof.

The inflatable cushion 24 is disposed within the recess 22 formed in the central portion of the padded inner layer 20 of the bicycle seat 12. The inflatable cushion 24 has a generally hourglass configuration. The inflatable cushion 24 has an air tube 26 extending outwardly therefrom and extending outwardly of the bicycle seat 12. A free end of the air tube 26 has a hand pump 28 coupled thereto for selectively pumping air into the cushion 24.

Additionally, a lower surface of the bicycle seat 12 could be provided within a storage chamber that will allow for the storage of the hand pump and the air tube when not in use. The rider will simply inflate the cushion 24 until the proper comfort level is reached whereupon they may disconnect the air tube 26 and the hand pump 28 to proceed with riding the bicycle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A bicycle seat with inflatable interior for protecting the genital area of a bicyclist comprising, in combination:

a bicycle seat comprised of a seat portion and a stem portion, the stem portion coupling the bicycle seat to a frame of a standard bicycle, the seat portion having an outer layer and a padded inner layer, the padded inner layer having a recess formed in a central portion thereof;

an inflatable cushion disposed within the recess formed in the central portion of the padded inner layer of the bicycle seat, the inflatable cushion having a generally hourglass configuration, the inflatable cushion having an air tube extending outwardly therefrom and extending outwardly of the bicycle seat, a free end of the air tube having a hand pump coupled thereto for selectively pumping air into the cushion.

\* \* \* \* \*